(12) United States Patent
Ijima et al.

(10) Patent No.: US 6,665,238 B2
(45) Date of Patent: Dec. 16, 2003

(54) LENS DRIVING DEVICE, AN OPTICAL PICKUP INCLUDING THE LENS DRIVING DEVICE, AND A PRODUCTION METHOD FOR THE LENS DRIVING DEVICE

(75) Inventors: Shinichi Ijima, Takatsuki (JP); Kazuhiko Yamanaka, Takatsuki (JP); Kazutoshi Onozawa, Takatsuki (JP); Hideyuki Nakanishi, Otsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 449 days.

(21) Appl. No.: 09/820,076

(22) Filed: Mar. 28, 2001

(65) Prior Publication Data

US 2001/0028623 A1 Oct. 11, 2001

(30) Foreign Application Priority Data

Mar. 29, 2000 (JP) ........................................ 2000-092383

(51) Int. Cl.[7] .................................................. G11B 7/00
(52) U.S. Cl. ..................................... 369/44.15; 359/823
(58) Field of Search ............................ 369/44.14, 44.15, 369/44.16, 44.21, 44.22, 112.23; 359/811, 812, 813, 814, 822, 824

(56) References Cited

U.S. PATENT DOCUMENTS

| 5,428,481 | A | * | 6/1995 | Ikegame et al. | ............. | 359/814 |
| 5,841,593 | A | * | 11/1998 | Ikegame et al. | ......... | 369/44.15 |
| 6,160,771 | A | * | 12/2000 | Kawano et al. | .......... | 369/44.14 |
| 6,310,852 | B1 | * | 10/2001 | Tomita et al. | ........... | 369/44.15 |

* cited by examiner

Primary Examiner—Thang V. Tran

(57) ABSTRACT

A lens holding member carrying an objective lens is movable and supported by a fixed member via a plurality of supporting members. Each supporting member includes a bent part in its base portion on the side of the fixed member. The bent part is bent in a first direction (focusing direction) and a second direction (tracking direction) that are perpendicular to each another. Each supporting member is shaped so as to make all the principal planes of the supporting member parallel to the second direction. The fixed member includes a concave, which is impregnated with a gel material so that the bent part is covered with the gel material.

23 Claims, 13 Drawing Sheets

LENS DRIVING DEVICE, AN OPTICAL PICKUP INCLUDING THE LENS DRIVING DEVICE, AND A PRODUCTION METHOD FOR THE LENS DRIVING DEVICE

BACKGROUND OF THE INVENTION (1) Field of the Invention

The present invention relates to an optical pickup used in an optical player/recorder that performs reproduction from and recording onto an optical recording medium such as an optical disc, a lens driving device that is a principal part of the optical pickup, and a production method for the lens driving device.

(2) Description of the Related Art

A lens driving device is used in an optical pickup contained in an optical player/recorder that reproduces data from and records data onto an optical recording medium, such as an optical disc including a CD (Compact Disc) and a DVD (digital versatile disc). This lens driving device performs focusing control to focus a laser beam on a recording surface of an optical recording medium, and tracking control to follow a track on the recording surface.

For instance, a CD loaded in a CD player/recorder rotates at a high speed (200 to 500 rotations per second), and therefore an object lens is moved frequently at short time intervals through the focusing/tracking control. Due to this driving of the objective lens, a variety of resonance frequencies inherent in the CD player/recorder are produced over a wide frequency range, which has a negative effect on a read from the optical recording medium.

A lens driving device is therefore required to have a mechanism for suppressing such resonance occurring to the objective lens over a wide frequency band including low to high frequencies.

An example of a conventional lens driving device that suppresses such resonance is disclosed in Japanese Laid-Open Patent Application No. 7-105551.

FIG. 1A is a diagrammatic view of this lens driving device 500 as the first conventional example. For ease of explanation, a fixed member 507 alone is shown in sectional view.

As shown in the figure, for the lens driving device 500, a movable member 502 carrying an objective lens 501 is supported in a cantilevered state by a fixed member 507 via four fine elastic supporting members 503–506, of which supporting members 504 and 506 are hidden by supporting members 503 and 505.

The fixed member 507 is filled with a damping material, which encloses a base portion of each of the elastic supporting members 503–506. A part of the enclosed base portion of each of the elastic supporting members 503–506 is slightly bent upward, which is considered to increase the damping material's effect of suppressing vibrations occurring to the supporting members 503–506, especially small quick vibrations in a high frequency range.

Another example of a conventional lens driving device is disclosed in Japanese Laid-Open Patent Application No. 9-7203. FIG. 1B shows an external appearance of the second conventional lens driving device 600 in perspective view.

As shown in the figure, for the lens driving device 600, a movable member 602 carrying an objective lens 601 is supported in a cantilevered state by a fixed member 607 via four fine elastic supporting members 603–606. An end of the supporting member 603 is shaped into a form similar to a letter "U" to form a bent part 603a. Other supporting members 604–606 are also shaped into this form.

The supporting members 603–606 are not parallel to one another. When viewed from a direction "A", the supporting members 603–606 are slanted relative to a direction perpendicular to a longitudinal direction of the supporting members 603–606, and connect the movable member 602 with the fixed member 607.

When a principal plane of each of the supporting members 603–606 is slanted as stated above, a displacement of each supporting member caused by vibrations in the focusing (vertical) direction and the tracking (horizontal) direction becomes large. By applying a damping material (not shown in the figure) to bent parts like the bent part 603a, resonance of the supporting members 603–606 is considered to be effectively suppressed.

The lens driving devices 500 and 600 of the first and second conventional technology, however, have the following problems.

The lens driving device 500 is capable of effectively suppressing resonance in the focusing direction and the longitudinal direction of the supporting members 503–506. This driving device 500, however, cannot effectively suppress a vibration in the tracking direction perpendicular to the above two directions.

With the lens driving device 500, end parts of the supporting members 503–506 are attached one by one to the movable member 502 and the fixed member 507, with the supporting members 503–508 being slightly and uniformly curved. Giving a uniform curve to all the supporting members 503–506, however, is very difficult. When the supporting members 503–506 having a different extent of the curving are used to connect the movable member 502 with the fixed member 507, the fixed member 507 supports the movable member 502 in a state of the movable member 502 being tilted relative to the fixed member 507. Such variations in the curving can actually exist between different lens driving devices, which is not desirable for obtaining correct optical information. To suppress such variations, the plurality of supporting members 503–506 need to be attached one by one while the extent of the curving of each supporting member is precisely adjusted. Such production process, however, extremely decreases the productivity.

The insert molding is considered to overcome this problem. The insert molding is performed in a manner that embeds end parts of each elastic supporting member in the movable member 502 and the fixed member 507. This production process may provide almost uniform extent of the curving to all the supporting members 503–506 although the problem of vibrations in the tracking direction still remains.

With the second conventional technology, on the other hand, a bent part is provided to each of the elastic supporting members 603–606, which are slanted in the stated manner and connect the movable member with the fixed member. This construction appears to be capable of suppressing vibrations in the tracking direction as well as the focusing direction. However, when the plurality of the supporting members 603–606 are attached one by one in the production process, a total number of production processes increases, and variations in properties of supporting members 603–606 may be caused by deformations in the supporting members 603–606 during the production process.

To reduce these variations, the elastic supporting members 603–606 may be integrally molded with the movable member and the fixed member by the insert molding as stated above. However, it is impossible to perform the insert molding using simple molds composed of a top mold, a bottom mold, and side molds since principal planes of the supporting members 603–606 are not parallel to one another. Accordingly, producing the lens driving unit 600 by the insert molding requires more pieces of molds, which makes production processes more complex.

SUMMARY OF THE INVENTION

The present invention is made in view of the above problems, and aims, as the first object, to provide a lens driving device that is capable of effectively suppressing resonance over high and low frequency bands, which is caused by the high-speed driving of the objective lens, and that can be produced with high productivity. As the second object, the present invention aims to provide a production method for such lens driving device. As the third object, the present invention aims to provide an optical pickup including the lens driving device.

The first object is achieved by a lens driving device, including: an objective lens; a first member that holds the objective lens; a second member; a plurality of supporting members that are elastic and that each include a first connected part and a second connected part that are connected respectively to the first member and the second member, so that the second member supports the first member in a manner that allows the first member to move in predetermined directions with respect to the second member; and a driving unit for driving the first member in the predetermined directions. The plurality of supporting members each include a first bent part and a second bent part that are present between the first connected part and the second connected part, the first bent part bending in a first direction, the second bent part bending in a second direction that is substantially perpendicular to the first direction.

For this construction, the first and second bent parts increase an amount of a displacement of vibrations occurring to the first member carrying the objective lens. By affixing the damping material to these bent parts, the effect of suppressing resonance can be further increased. In addition, since the first and second bent parts are bent in different directions that are perpendicular to each other, components of vibrations in all the directions are distributed to both bent parts so that a displacement of each supporting member increases. Affixing the damping material to these bent parts ensures high resonance suppressing effect over wide frequency band including high and low frequencies.

Here, each of the plurality of supporting members may be a narrow plate, and all principal planes of each supporting member, including a principal plane of the first and second bent parts, may be parallel to a certain direction that is perpendicular to a longitudinal direction of the plurality of supporting members. This allows the above lens driving device to be produced by applying side molds in the above certain direction to perform insert molding, thereby achieving mass-production of the lens driving devices having uniform properties.

The second object of the present invention can be achieved by a production method for producing a lens driving device that includes: a body structure including (a) a first member for holding an objective lens and (b) a second member for supporting the first member via a plurality of supporting members; and a driving unit for driving the first member in predetermined directions with respect to the second member to move the objective lens. The production method includes: a body structure producing step for producing the body structure; a lens affixing step for affixing the objective lens to the first member in the body structure; and a driving unit affixing step for affixing the driving unit to the body structure. The above body structure producing step includes: a supporting member producing substep for processing a plate to form the plurality of supporting members that each include a first bent part and a second bent part between both extremities of each supporting member, the first bent part bending in a first direction that is perpendicular to a principal plane of the plate, the second bent part bending in a second direction that is parallel to the principal plane and perpendicular to a longitudinal direction of the plurality of supporting members; and an injection molding substep for molding the first member and the second member by injection molding in a manner that predetermined parts of each supporting member are embedded in the first and second members. Here, each predetermined part is a connection part to one of the first member and the second member.

This production method does not require a process for connecting the plurality of supporting members one by one to the movable first member and the fixed second member. As a result, the lens driving devices achieving the high effect of suppressing resonance can be produced in volume, without varieties between different lens driving devices being produced.

The third object is achieved by an optical pickup, including: a semiconductor laser for emitting a laser beam; an objective lens for converging the emitted laser beam on an optical recording medium; a first member that holds the objective lens; a second member; a plurality of supporting members that are elastic and that each include a first connected part and a second connected part that are connected respectively to the first member and the second member so that the second member supports the first member in a manner that allows the first member to move in predetermined directions with respect to the second member; and a driving unit for driving the first member in the predetermined directions. The plurality of supporting members each include a first bent part and a second bent part that are present between the first connected part and the second connected part. The first bent part bends in a first direction, and the second bent part bends in a second direction that is substantially perpendicular to the first direction.

This construction achieves the optical pickup having very high reading precision which includes a lens driving device that can effectively suppress resonance and that can be produced with high productivity.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 1A:
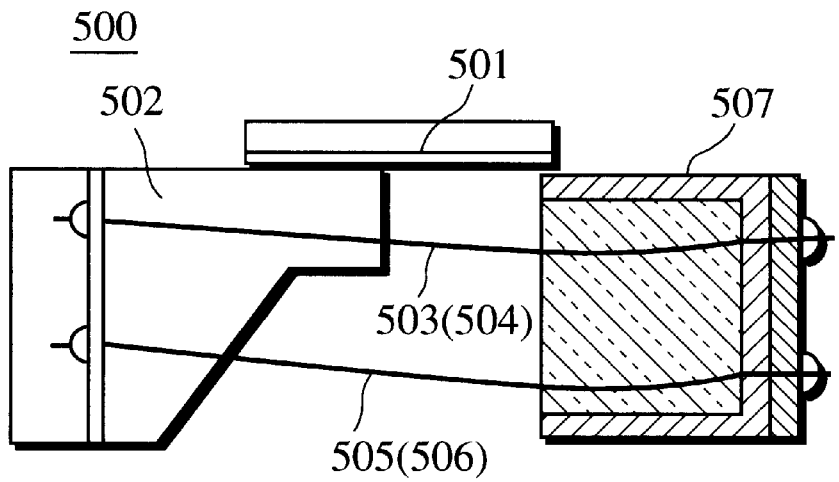
FIGS. 1A and 1B show a supported construction of a movable member in a conventional lens driving device.
Figure 1B:
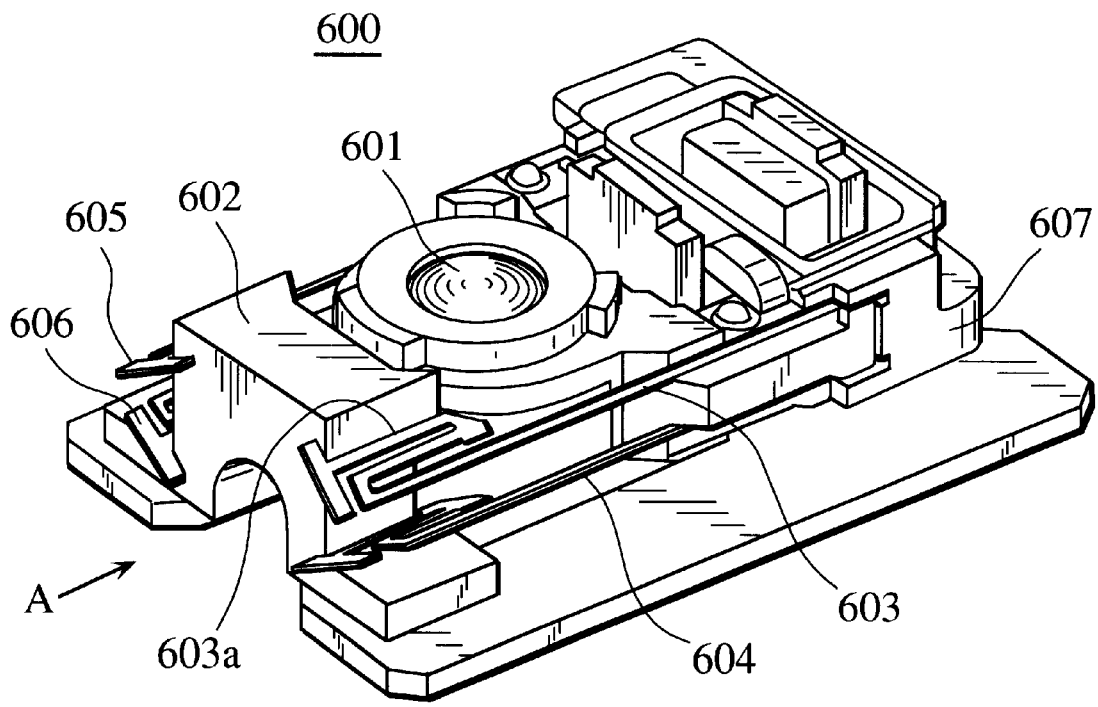
Figure 2:
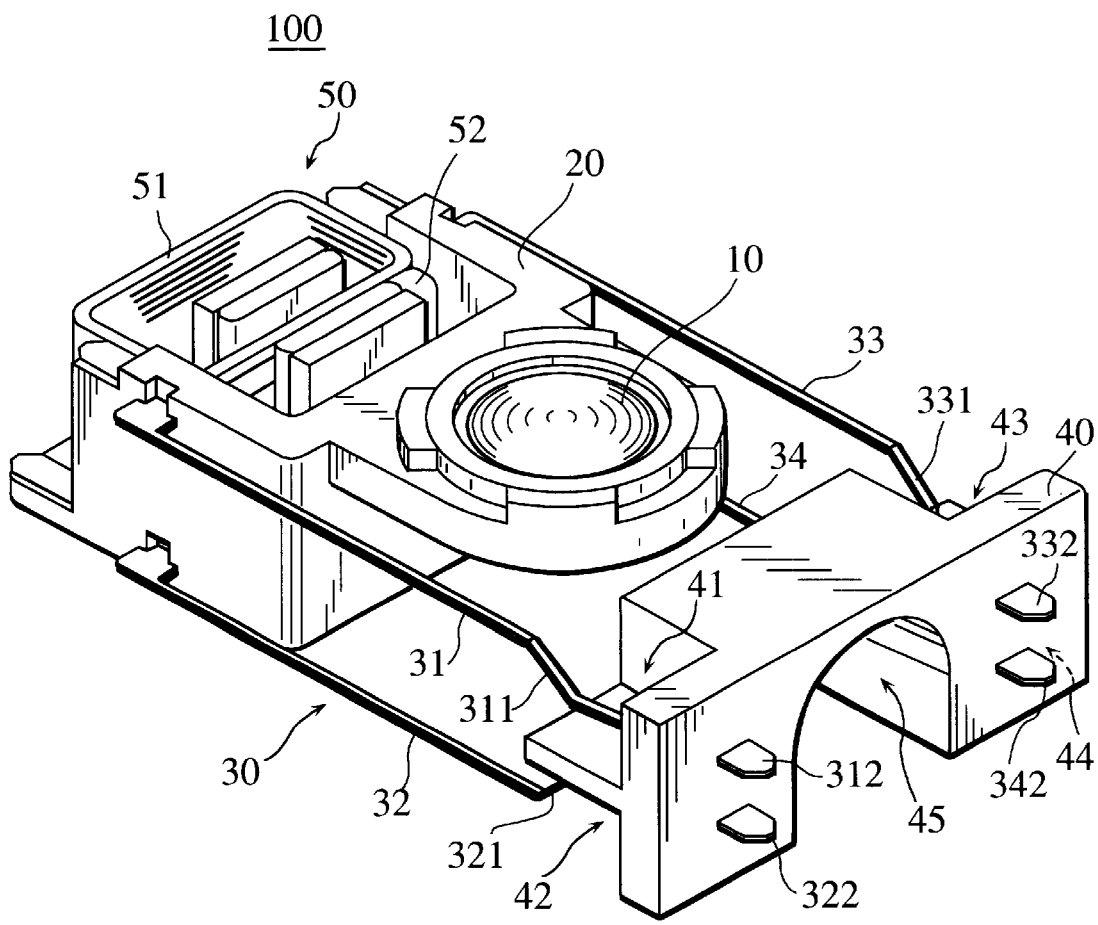
FIG. 2 shows an external appearance of a lens driving device of the first embodiment in perspective view.

The following describes an optical pickup of the present invention by using several embodiments with reference to drawings.
First Embodiment
Construction of Optical Pickup The following describes a construction of a lens driving device of an optical pickup according to the present embodiment FIG. 2 shows a construction of major parts of the lens driving device 100 in perspective view.

As shown in the figure, an objective lens 10 is carried by a lens holding member 20, which is movable and supported by a fixed member 40 via four elastic conductive supporting members 31–34. The fixed member 40 is affixed to an optical base 60 (see FIG. 4). The four elastic conductive supporting members 31–34 make up a supporting member group 30.

The lens holding member 20 also carries a driving coil unit 50 containing a focusing coil 51 and a tracking coil 52. The focusing coil 51 drives the objective lens 10 in its optical axis (i.e., a focusing direction, which is a direction "Z" in the figure), and the tracking coil 52 drives the objective lens 10 in a direction in which tracks on an optical recording medium are followed (i.e., in a tracking direction, which is a direction "Y" in the figure).

The elastic supporting members 31–34 are made of a conductive material and electrically connected to connecting terminals of the driving coil unit 50 inside the lens holding member 20. End parts 312, 322, 332, and 342 extend outward through the fixed member 40, and a driving current is supplied from these end parts 312, 322, 332, and 342. As the driving coil unit 50 is carried by the lens holding member 20, a weight of the lens holding member 20 can be reduced more than when magnets are carried. In addition, since the supporting members 31–34 are used as leads that carry a current to the driving coil unit 50, it is unnecessary to additionally attach leads directly to the driving coil unit 50, which enables the lens holding member 20 to move smoothly.

The elastic supporting members 31–34 are bent near their base portions on the side of the fixed member 40 to form bent parts 311, 321, 331, and 341, respectively (of which the bent 341 is not shown as is hidden behind the fixed member 40). The fixed member 40 includes concaves 41–44 in which the bent parts 311, 321, 331, and 341 are present. These concaves 41–44 are filled with a gel damping material which encloses the bent parts 311, 321, 331, and 341.

Each of the bent parts 311, 321, 331, and 341 is bent in two directions "Z" and "Y" that are perpendicular to each other so as to make the bent parts 311, 321, 331, and 341 horizontally and vertically symmetrical with respect to the center of the lens driving device 100. This construction can reliably suppress resonance in the above two directions "Z" and "Y".

Figure 3A:
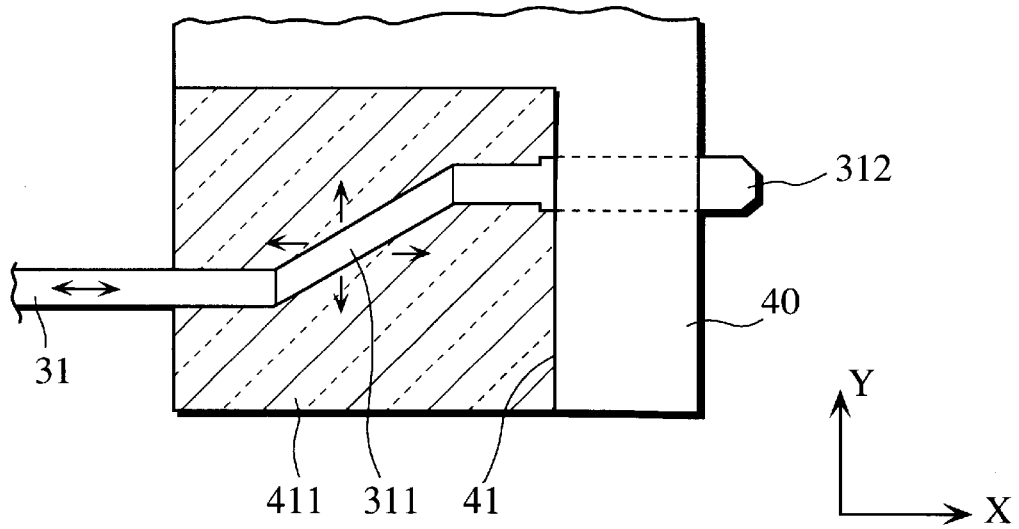
FIGS. 3A and 3B show a state of a bent part of a supporting member effectively suppressing resonance.
Figure 3B:
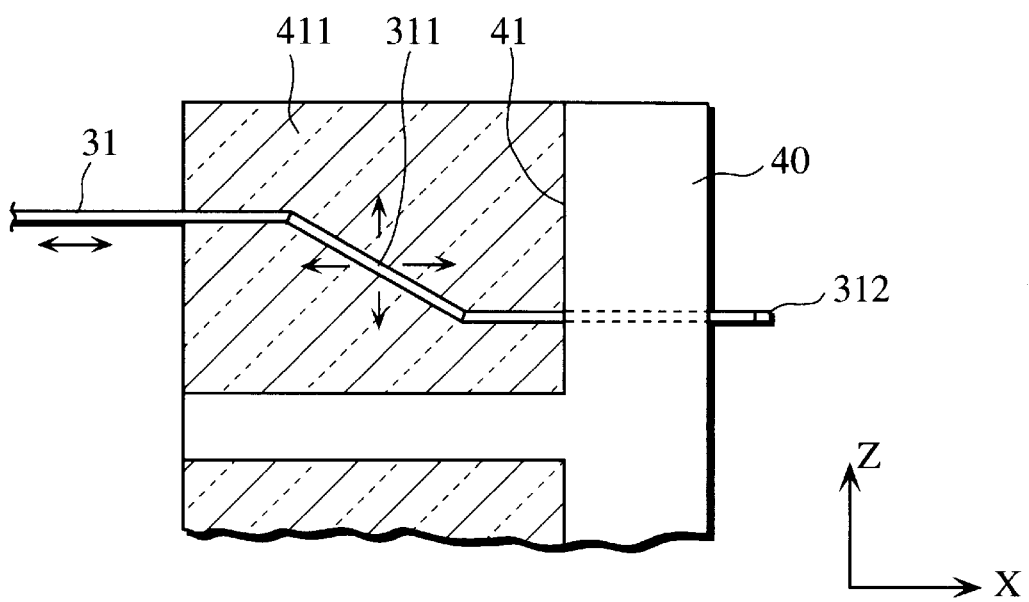

FIG. 3A is a top view of the bent part 311 in the concave 41 of the fixed member 40 viewed from the direction "–Z", and FIG. 3B is a section view of the same part viewed from the direction "Y". In both FIGS. 3A and 3B, the damping material is shown as being broken away along a plane in which the supporting member 31 is exposed for ease of explanation.

As shown in the figure, the bent part 311 is bent in both the "Y" direction and the "Z" direction at predetermined angles, and enclosed by a gel damping material 411.

The damping material 411 is made of, for instance, a silicon porous material made of a mixture composed of a gel-like silicon and a bridging agent, has viscoelasticity that is almost uniform in all the directions, and therefore can suppress resonance effectively.

When the objective lens 10 is moved in the focusing direction "Z" and the tracking direction "Y" at a high speed, resonance occurs to the lens holding member 20 at certain frequencies in high and low frequency bands. Resonance in a low frequency band produces a resonant mode in which a fundamental wave is generated in the supporting members 31–34 in their longitudinal direction. On the other hand, resonance in a high frequency band produces a higher resonant mode.

The higher resonant mode in a high frequency band occurs mainly in the longitudinal direction of the supporting member 31. Accordingly, when bent parts like the bent part 31 shown in FIGS. 3A and 3B are provided, a displacement of each supporting member in a direction (indicated by arrows in the figure) perpendicular to the above longitudinal direction becomes large. As a result, resonance can be reliably suppressed due to the resonance suppressing effect of the damping material 411 filled into each concave. In a low frequency band also, a displacement of each supporting member in the focusing direction and the tracking direction increases since the bent part is bent in the tracking direction as well as the focusing direction. As a result, resonance can be more effectively suppressed.

Figure 4:
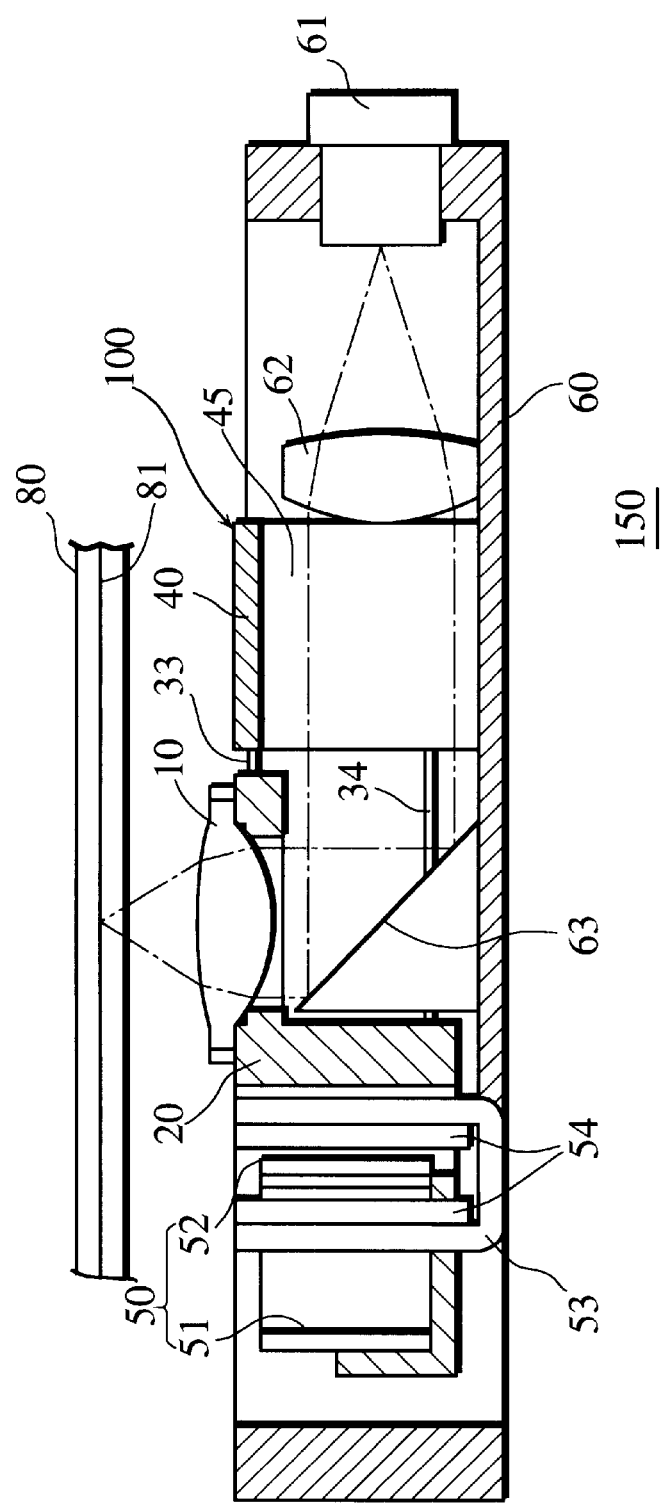
FIG. 4 is a vertical sectional view of an optical pickup including the lens driving device shown in FIG. 2.

FIG. 4 is a vertical sectional view of an optical pickup 150 that carries the lens driving device 100 shown in FIG. 2.

This optical pickup 150 comprises the above lens driving device 100, a semiconductor laser unit 61, a collimating lens 62, and a rising mirror 63 that are positioned on the optical base 60. A semiconductor laser and photodetectors are provided inside the semiconductor laser unit 61. The lens driving device 100 is affixed on the optical base 60 in a manner that a principal ray of a laser beam emitted from the semiconductor laser unit 61 becomes parallel to the longitudinal direction of the lens driving device 100, and that a principal ray of the laser beam deflected by the rising mirror 63 substantially coincides with the optical axis of the objective lens 10.

The lens holding member 20 carries the driving coil unit 50 containing the focusing coil 51 and the tracking coil 52 as stated earlier. A yoke 53 has a vertical section similar to the letter "U" and is affixed onto a position, which corresponds to a position where the driving coil unit 50 is present, on the optical base 60. The yoke 53 contains a pair of magnets 54 arranged so as to their different magnetic poles face each other. A magnetic circuit is produced between the pair of magnets 54 and the driving coil unit 50. Consequently, an electromagnetic force is produced in the focusing direction and the tracking direction.

Operations of the Optical Pickup 150

The following describes operations performed by the optical pickup 150. The semiconductor laser inside the semiconductor laser unit 61 on the optical base 60 emits the laser beam, which is then collimated by the collimating lens 62, and deflected by the rising mirror 63 so as to make an optical path of the deflected laser beam parallel to the optical axis of the objective lens 10. The laser beam entering into the objective lens 10 is focused onto a recording surface 81 of an optical recording medium 80.

After this, the laser beam reflected by the recording surface 81 reverses along the same optical path as used when the laser beam first enters into the objective lens 10. The photodetectors inside the semiconductor laser unit 61 receives the reflected laser beam to detect an information signal and a servo signal that contains a focusing error signal and a tracking error signal. The detected servo signal and information signal are sent to a control circuit (which is not shown in the figure). The detection method of these signals is well-known, and therefore will not be explained in detail.

Based on the focusing error signal, the control circuit controls a driving current to be supplied to the focusing coil 51, so that magnetic effect produced by the focusing coil 51 and the magnets 54 moves the objective lens 10 to correctly position a focal point of the objective lens 10 on the recording surface 81. Based on the tracking error signal, the control circuit also controls a driving current to be supplied to the tracking coil 52 so that magnetic effect produced by the tracking coil 52 and the magnets 54 moves the objective lens 10 so as to make the optical axis of the objective lens 10 follow a track on the recording surface 81. Resonance of the lens holding member 20 due to such high-speed servo control can be suppressed by the bent parts 311, 321, 331, 341 of the elastic supporting members 31–34 and by the damping material enclosing these parts 311, 321, 331, and 341 since they can effectively suppress resonance in the focusing direction and the tracking direction. As a result, the present optical pickup 150 of the present embodiment is capable of precisely reading information from the optical recording medium 80.

Production Method for Lens Driving Device 100

Figure 5:
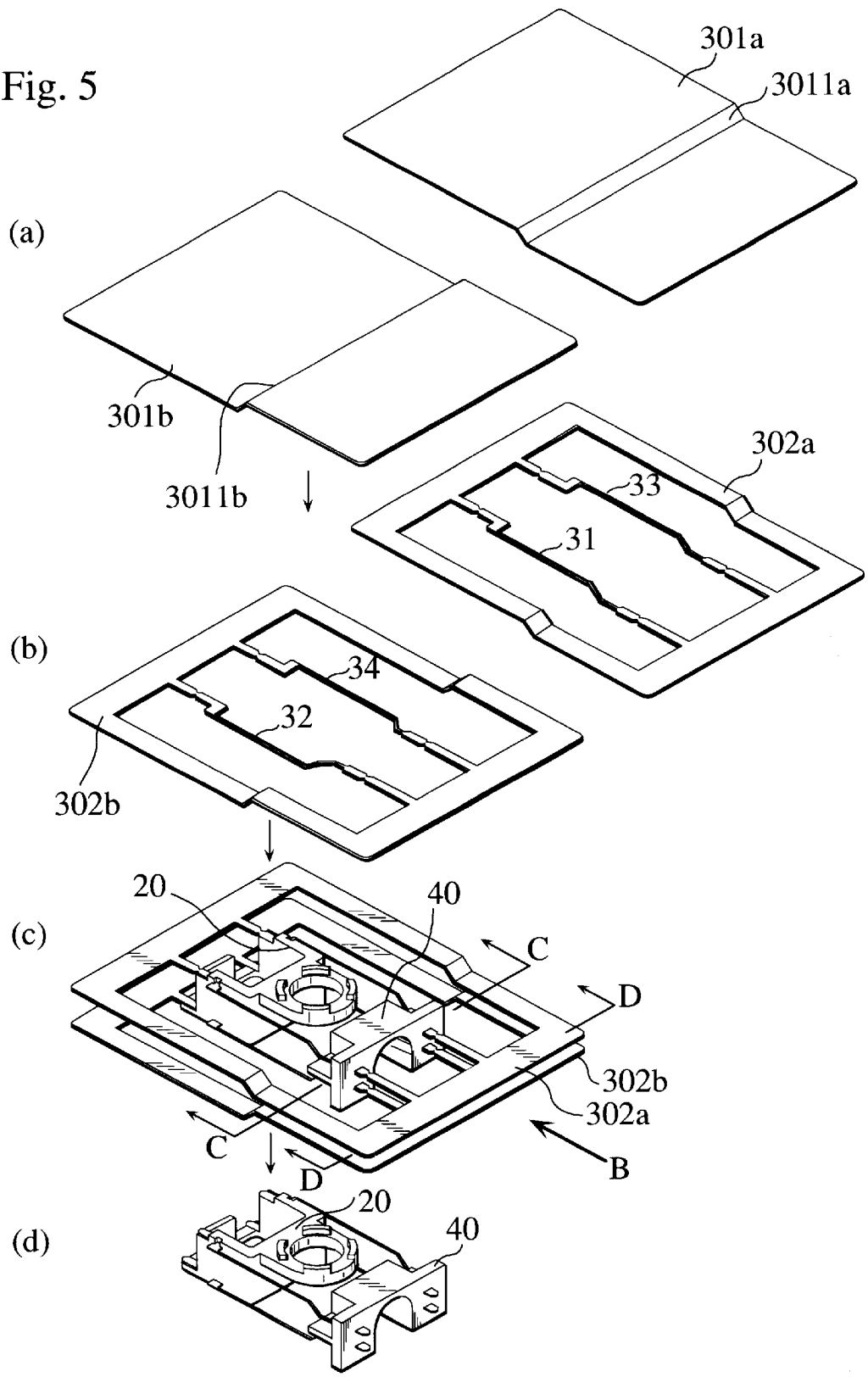
FIG. 5 shows production process steps for the lens driving device shown in FIG. 2.

The following describes a production method of the lens driving device 100 of the present embodiment with reference to FIG. 5.

Two conductive plates 301a and 301b having an appropriate elasticity are used to produce the elastic supporting members 31–34. The conductive plates 301a and 301b may be made of phosphor bronze, titanium copper, or beryllium copper, for instance. By performing press working using a bending mold on these plates 302a and 302b, the plates 302a and 302b are bent downward and upward so that sloped parts 3011a and 3011b are respectively formed (Step "a").

The plates 301a and 301b are die-cut using a press mold to remove unnecessary parts. As a result, an upper frame member 302a and a lower frame member 302b, which have a shape of two supporting members linked to an outer part of each plate, are formed (Step "b"). The above press mold has a shape to bend the upper supporting members 31 and 33 and the lower supporting members 32 and 34 inward in their sloped parts 3011a and 3011b, respectively. As a result, the plurality of supporting members 31–34 have the bent parts 311, 321, 331, and 341 that are bent in the focusing direction and the tracking direction at predetermined angles.

Following this, the lower frame member 302b is positioned on a bottom mold (not shown in the figure), and then side molds are applied from right and left with respect to a direction in which the elastic supporting members 31–34 extend. Parts of the bottom mold and the side molds are in contact with one another in a manner that the bottom mold and the side molds sandwich parts of the lower frame member 302b in between. After this, the upper frame member 302a is positioned on the top of the side molds, and a top mold (not shown in the figure) covers the positioned upper frame member 302a from the above. Parts of the top mold and the side molds are in contact with one another in a manner that the top mold and the side molds sandwich parts of the upper frame member 302a in between.

After this, the insert molding is performed using a resin on the two frame members 302a and 302b that are completely fixed inside the above molds. As a result, the lens holding member 20 and the fixed member 40 are integrally molded, with end parts of the supporting members 31–34 being embedded in the lens holding member 20 and the fixed member (Step "c").

After this, unnecessary portions, such as frame-like portions remaining on the periphery of the lens holding member 20 and the fixed member 40 are removed to electrically separate the supporting members 31–34 from one another (Step "d").

Following this, the objective lens 10 is installed into the lens holding member 20, and the driving coil unit 50 is installed. The supporting members 31–34 are electrically connected to electrical terminals inside the lens holding member 20 by using solder, bonding wires, or the like. This enables a driving current to be supplied to the driving coil unit 50 via the supporting members 31–34.

Finally, the concaves 41–44 of the fixed member 40 are impregnated with the damping material. This completes production of the lens driving device 100.

The produced lens driving device 100 is affixed onto a predetermined position of the optical base 60, on which the semiconductor laser unit 61, the collimating lens 62, and the rising mirror 63 have been positioned. As a result, the optical pickup 150 is produced.

Note that the process in Step "d" for removing unnecessary portions from the frame members 302a and 302b may be performed after the objective lens 10 and the like have been installed.

FIGS. 6A–6F are diagrammatic drawings showing states of the insert molding in the above Step "c". These figures show a vertical section of the structure described in Step "c" viewed from a direction "B" in FIG. 5 to clearly show how the pieces of molds are combined. For ease of explanation, FIGS. 6A–6D show a section of the pieces of molds cut along a line C—C in Step "c" in FIG. 5, and a section of the frame members 302a–302b cut along a line D—D. A sectional shape of the fixed member 40 is also simplified in these figures.

Figure 6A:
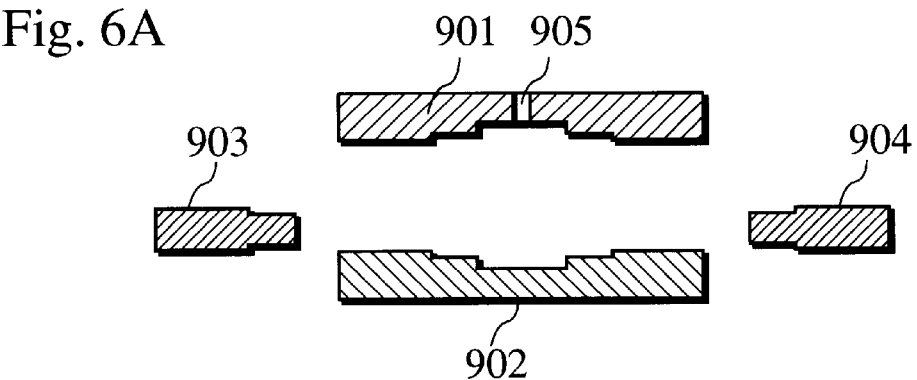
FIGS. 6A–6F show production process steps for molding a body of the lens driving device by the insert molding.
Figure 6B:
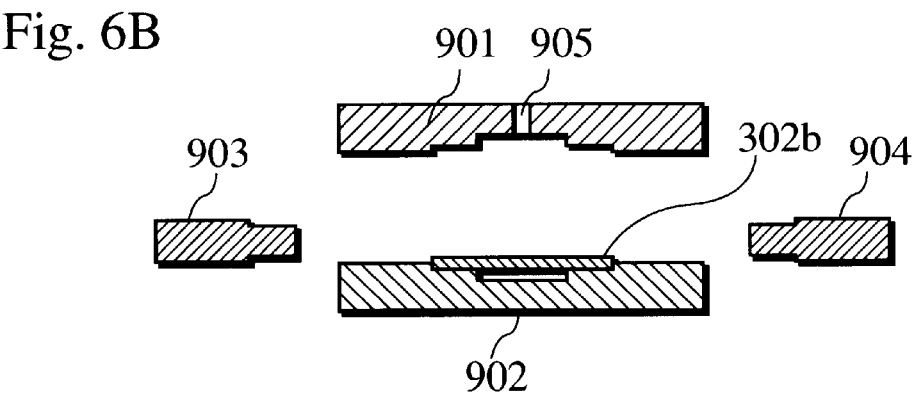

As shown in FIG. 6A, four pieces of molds are used for the insert molding. The four pieces of molds consist of a top mold 901, a bottom mold 902, and two side molds 903 and 904. The top mold 901 has an injection hole 905, into which resin is injected.

Figure 6C:
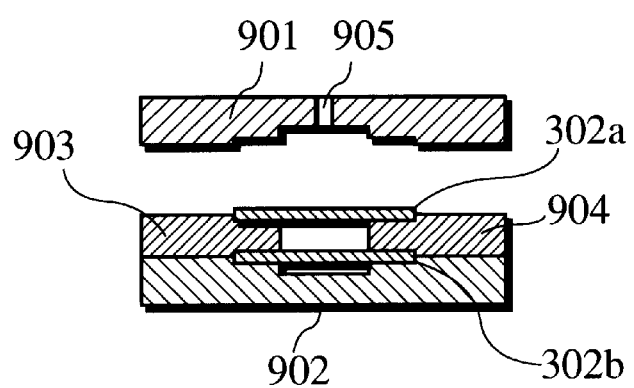
Figure 6D:
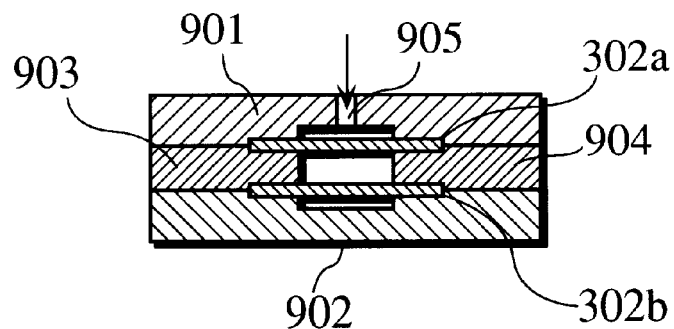
Figure 6E:
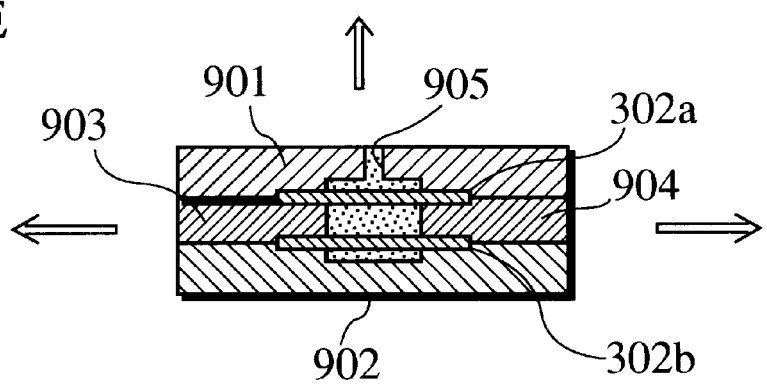
Figure 6F:
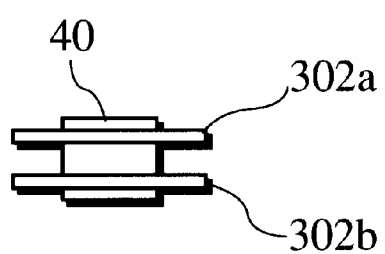

The lower frame member 302b is positioned on the bottom mold 902 (see FIG. 6B), on which the side molds 903 and 904 are placed. On the side molds 903 and 904, the upper frame member 302a is positioned (FIG. 6C). After this, the top mold 901 covers the upper frame member 302a and the side molds 903 and 904, and then molten resin is injected by the injection hole 905, with the top mold 901 pressing down the structure blow composed of the upper frame member 302a, the side molds 903 and 904, the lower frame member 302b, and the bottom mold 902 (FIG. 6D). After the injected resin solidifies, the top mold 901 is lifted off, and the side modes 903 and 904 are removed by pulling them in the horizontal direction. Solidified resin remaining in a part corresponding to the injection hole 905 is removed, so that the structure shown in Step "c" in FIG. 5 can be obtained (FIG. 6F).

In this way, the insert molding can be easily performed using four pieces of molds even when the four supporting members 31–34 have bent parts 311, 321, 331, and 341 bending in two directions. This is because all the principal planes of different parts, including a bent part, of each of the supporting members 31–34 are in parallel to a direction in which the side molds 903 and 904 are applied and removed. This requires only two pieces of side molds consisting of one left mold and one right mold.

With the above production method for the lens driving device 100, the lens holding member 20 and the fixed member 40 are integrally molded, with the frame members 302a and 302b being fastened by molds. As a result, it is unnecessary to connect the supporting members 31–34 to the lens holding member 20 and to the fixed member 40 one by one. At the same time, variations in properties of the supporting members 31–34 can be reduced since unnecessary parts are removed from the frame members 302a and 302b only after the molding is performed. The above production method therefore achieves stable properties for all the supporting members 31–34 as well as increasing productivity.

Second Embodiment

With the optical pickup 150 of the first embodiment, the fixed member 40 of the lens driving device 100 is positioned on the optical base 60 on which the semiconductor laser unit 61 and the rising mirror 63 are also positioned. For this construction, the semiconductor laser unit 61 does not move when the objective lens 10 moves, and therefore positional relationship between the two slightly changes. Obviously, the optimal and constant positional relationship between the two should be always maintained for reading information with higher precision.

With an optical pickup of the second embodiment, the constant optical positional relationship between the objective lens and other optical components is maintained by including optical components, such as a semiconductor laser, in an enclosure that also includes an objective lens and by moving the whole enclosure.

Construction of Optical Pickup

Figure 7:
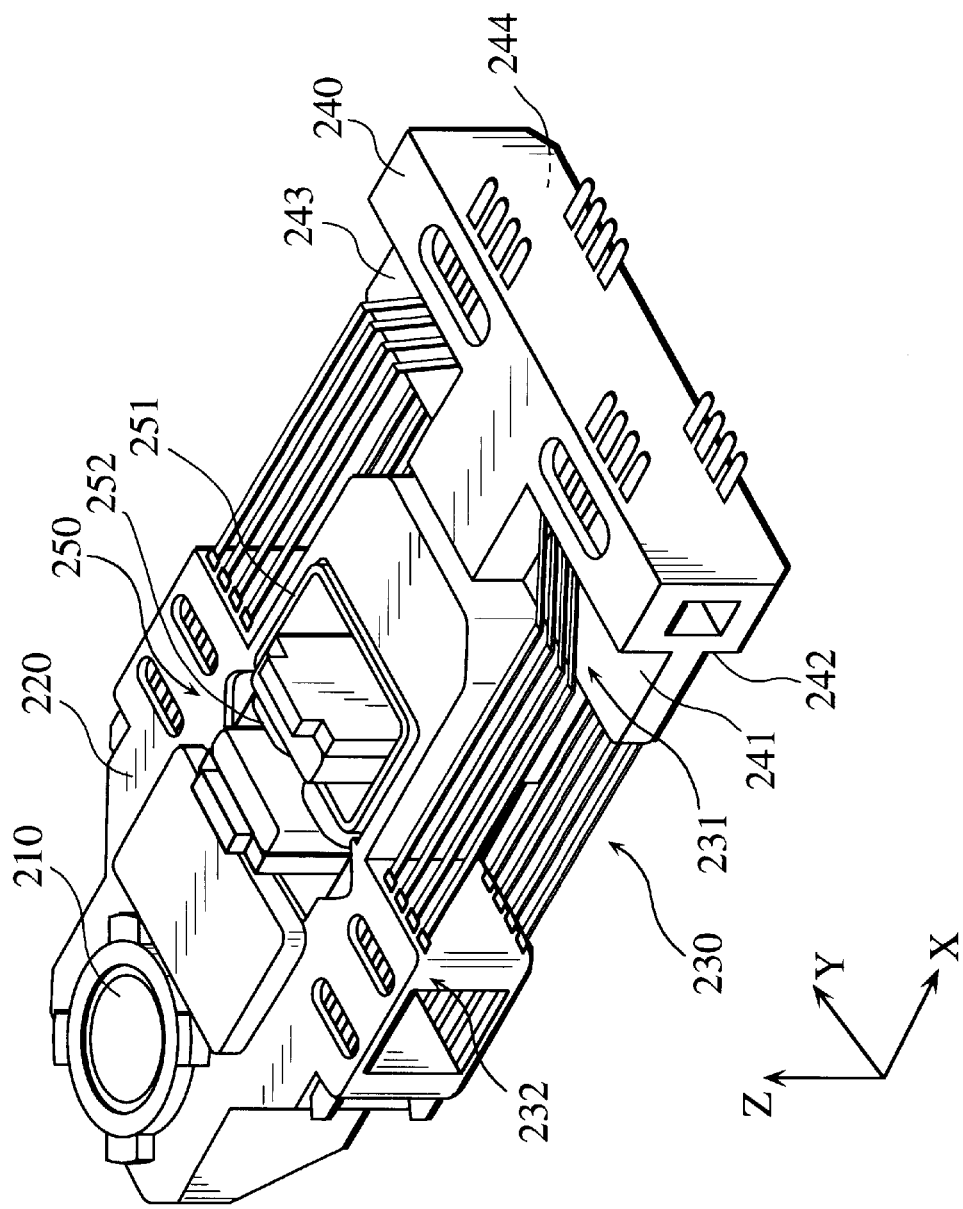
FIG. 7 shows an external appearance of an optical pickup of the second embodiment in perspective view.

FIG. 7 shows a construction of an optical pickup 200 of the second embodiment in perspective view.

As shown in the figure, the optical pickup 200 comprises: a movable enclosure 220; a fixed member 240 affixed onto an optical base 245 (see FIG. 8); and sixteen conductive elastic supporting members 230 which connect the fixed member 240 with the movable enclosure 220 in a manner that allows the enclosure 220 to move with respect to the fixed member 240. The enclosure 220 includes an objective lens 210, and a light emitting/receiving substrate (not shown in the figure) on which a semiconductor laser and photodetectors are integrally provided.

The enclosure 220 includes a driving coil unit 250 containing a focusing coil 251 and a tracking coil 252, which are provided for moving the enclosure 220 in the focusing direction and the tracking direction, respectively.

Inside a yoke 253 affixed onto the optical base 245, a pair of magnets 254 are arranged so that their different magnetic poles face each other. A magnetic circuit is produced between the pair of magnets 254 and the driving coil unit 250, and generates an electromagnetic force in the focusing direction and the tracking direction.

Connection points 232 are points at which the sixteen supporting members 230 are connected to the enclosure 220. The connection points 232 and a power point at which an electromagnetic force is exerted to the driving coil unit 250 are positioned in substantially the same position relative to the direction "X" (i.e., the longitudinal direction of the supporting members 230). At the same time, the connection points 232 and a center of gravity of the enclosure 220 are positioned in substantially the same position relative to the direction "X". These positional adjustments are performed, for instance, by making adjustments to external shapes of the enclosure 220, or by loading weights on the enclosure 210 and achieving the balance.

The sixteen supporting members 230 are divided into four groups that are positioned on the upper left, the lower left, the upper right, and the lower right. As in the first embodiment, the four groups of the supporting members 230 have bent parts like a bent part 231 near concaves 241–244 of the fixed member 240. Each bent part is bent in two directions "Z" and "Y". The concaves 241–244 are filled with the damping material so as to suppress resonance effectively over a wide band of frequencies including high and low frequencies. The present optical pickup 200 includes more supporting members than the optical pickup 150 of the first embodiment, thereby providing larger effect of suppressing resonance than in the first embodiment.

The supporting members 230 are electrically separated from one another, and their end parts on the side of the enclosure 220 are electrically connected to the semiconductor laser and the photodetectors on the light emitting/receiving substrate, and the driving coil unit 250 inside the enclosure 220. The opposite end parts of the supporting members 230 project from the end face of the fixed member 240, and are connected to a control circuit (not shown in the figure). For this construction, it is unnecessary to additionally attach leads directly to the driving coil unit 250, the semiconductor laser, and the photodetectors, which allows the lens holding member 20 to move smoothly.

Figure 8:
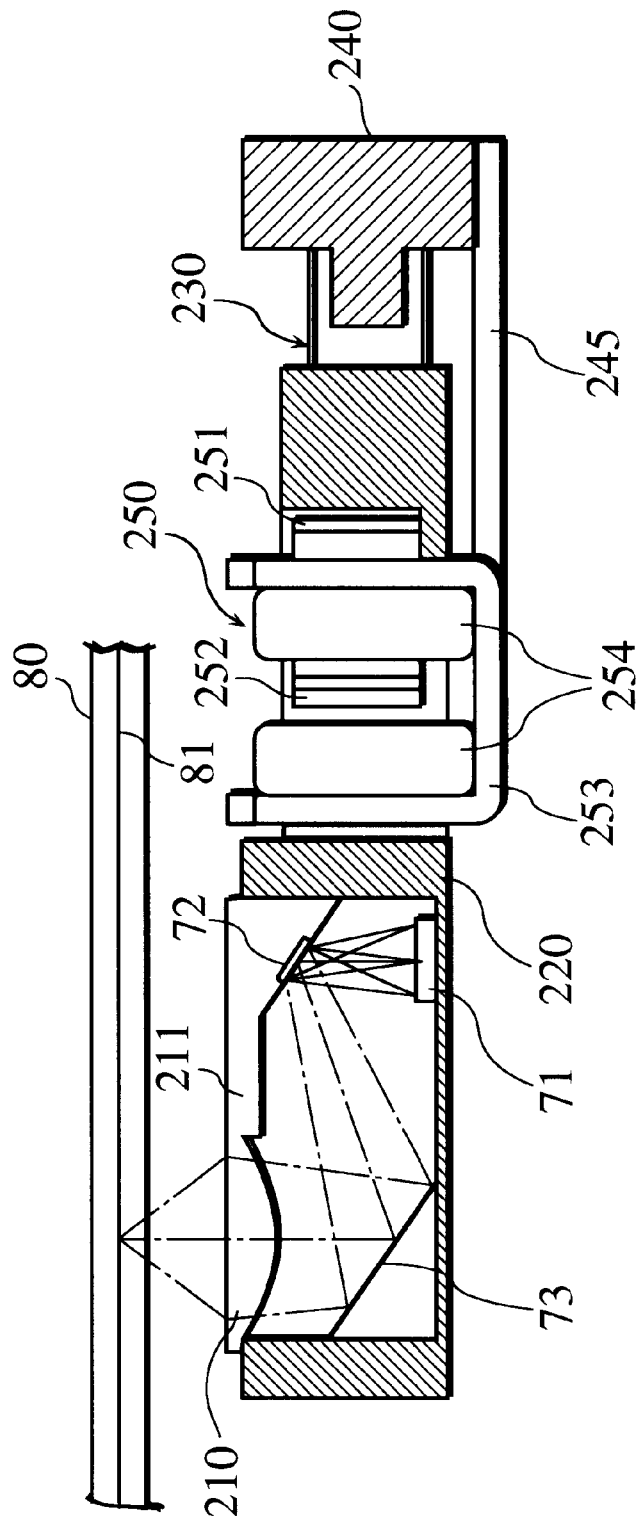
FIG. 8 is a vertical section al view of the optical pickup shown in FIG. 7.

The following describes an internal construction of the enclosure 220. FIG. 8 shows a diagrammatic representation of the internal construction of the enclosure 220 in vertical section view. This vertical section view is obtained by vertically cutting the enclosure 220 shown in FIG. 7 along the direction "X". As shown in the figure, the enclosure 220 includes a light emitting/receiving substrate 71, on which the semiconductor laser 74 (see FIG. 10) and the photodetectors are integrally provided. In an optical path of the laser beam emitted by the semiconductor laser 74, a first reflecting surface 72 is positioned. The first reflecting surface 72 has a reflecting hologram region, which is formed by such process as etching or resin molding.

In an optical path of the laser beam reflected by the first reflecting surface 72, a second reflecting surface 73 is positioned in parallel to the first reflecting surface 72. Positions of optical components and a focal length of the objective lens 210 are set so as to enable the laser beam reflected by the second reflecting surface 73 to be focused via the objective lens 210 onto the recording surface 81 of the optical recording medium 80.

For the present embodiment, the first reflecting surface 72 and the objective lens 210 are integrally molded as an objective-lens/hologram component 211. This component 211 seals an opening on the top of the enclosure 220 to prevent dust particles and the like from entering inside the enclosure 220, thereby enhancing reliability of optical system. Integrally molding the first reflecting surface 72 and the objective lens 210 also reduces a number of necessary parts and a number of production processes for an optical pickup.

The total number of the elastic supporting members 230 are not limited to sixteen, and may be determined in accordance with a necessary number of signal lines. It is not necessary to use every supporting member as a signal line and a power supplying line. In order to bring the optical pickup 200 in balance, the total number of the supporting members 230 should be preferably an even number or a multiple of four, and positioned symmetrically in the vertical and horizontal directions with respect to the center of the enclosure 220.

Operations of the Optical Pickup 200

The following describes operations of the above optical pickup 200.

The semiconductor laser 74 in the enclosure 220 emits a laser beam, which is first reflected by the first reflecting surface 72 and then by the second reflecting surface 73 so that the beam enters into the objective lens 210 in a manner that the principal ray of the beam approximately coincides with the optical axis of the objective lens 210. The laser beam passes through the objective lens 210, and is focused on the recording surface 81 of the optical recording medium 80.

The laser beam reflected by the recording surface 81 reverses along the optical path which it took before being reflected by the recording surface 81. (Hereafter, the laser beam reflected by the recording surface 81 is called a "returned beam".) The return beam passes through the objective lens 210 again, is reflected by the second reflecting surface 73, and is reflected and diffracted by the reflecting hologram region present on the first reflecting surface 72. This diffraction separates the return beam into a plurality of beams, which are focused onto a plurality of photodetectors on the light emitting/receiving substrate 71. As a result, a focusing error signal, a tracking error signal, and an information signal are detected and outputted.

Figure 9:
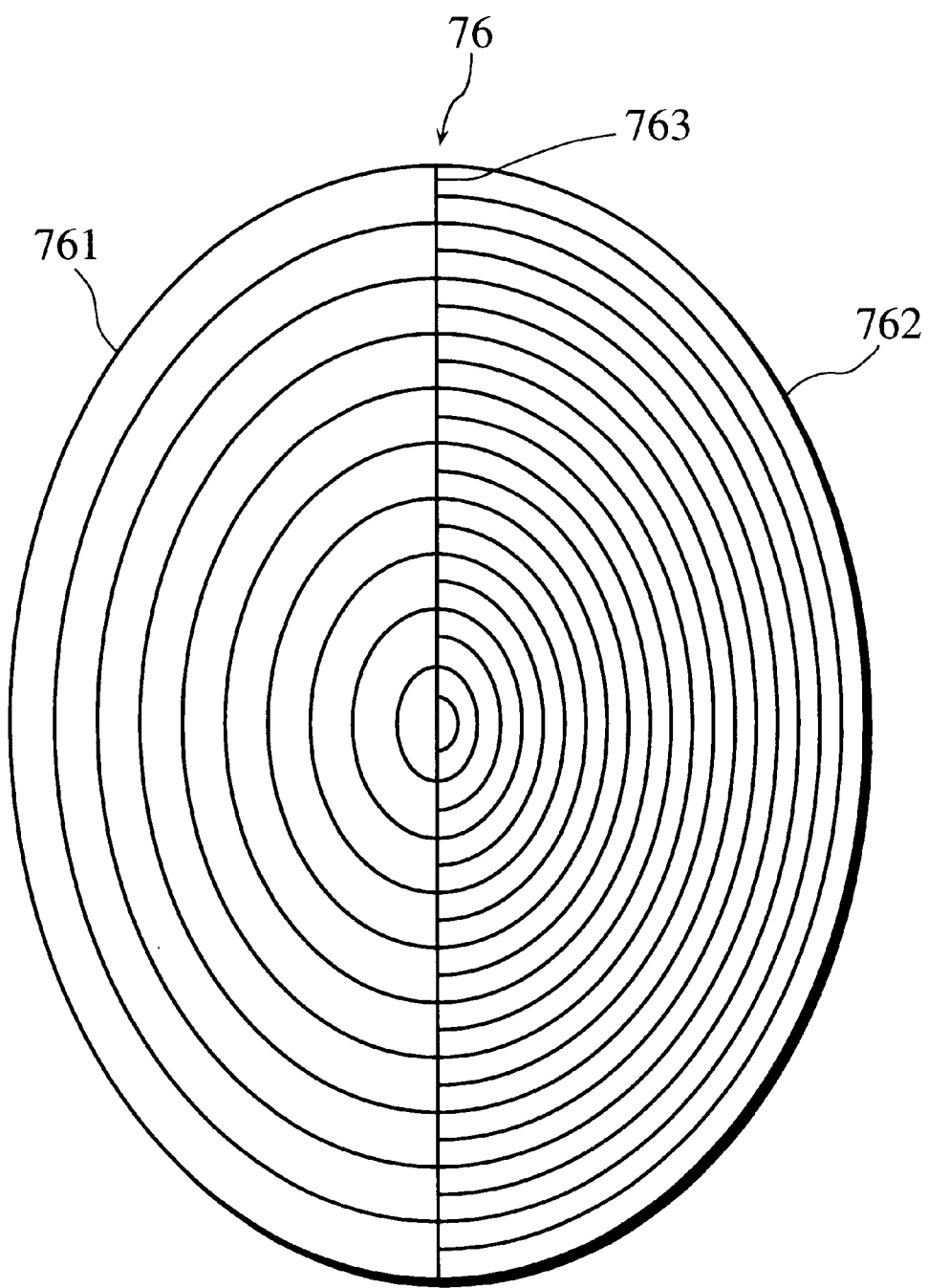
FIG. 9 shows a reflecting hologram region formed on a first reflecting surface positioned in an optical path of the above optical pickup.

FIG. 9 shows the reflecting hologram region 76 formed on the first reflecting surface 72. As shown in the figure, the reflecting hologram region 76 is divided by a dividing line 763, which is substantially parallel to tracks of the optical recording medium 80, into two hologram subregions 761 and 762 which reflect and diffract the return beam from the optical recording medium 80. The reflecting hologram region 76 has a wavefront converting function (i.e., lens effect) so as to provide focal distances that are different between: a positive first-order diffracted light diffracted by a hologram subregion; and a negative first-order diffracted light diffracted by the same hologram subregion. The reflecting hologram region 76 also has a curve pattern which is provided in consideration of incident angle dependency for the reflected beam. The hologram subregions 761 and 762 have diffraction gratings with different pitches so as to provide different diffraction angles.

Figure 10:
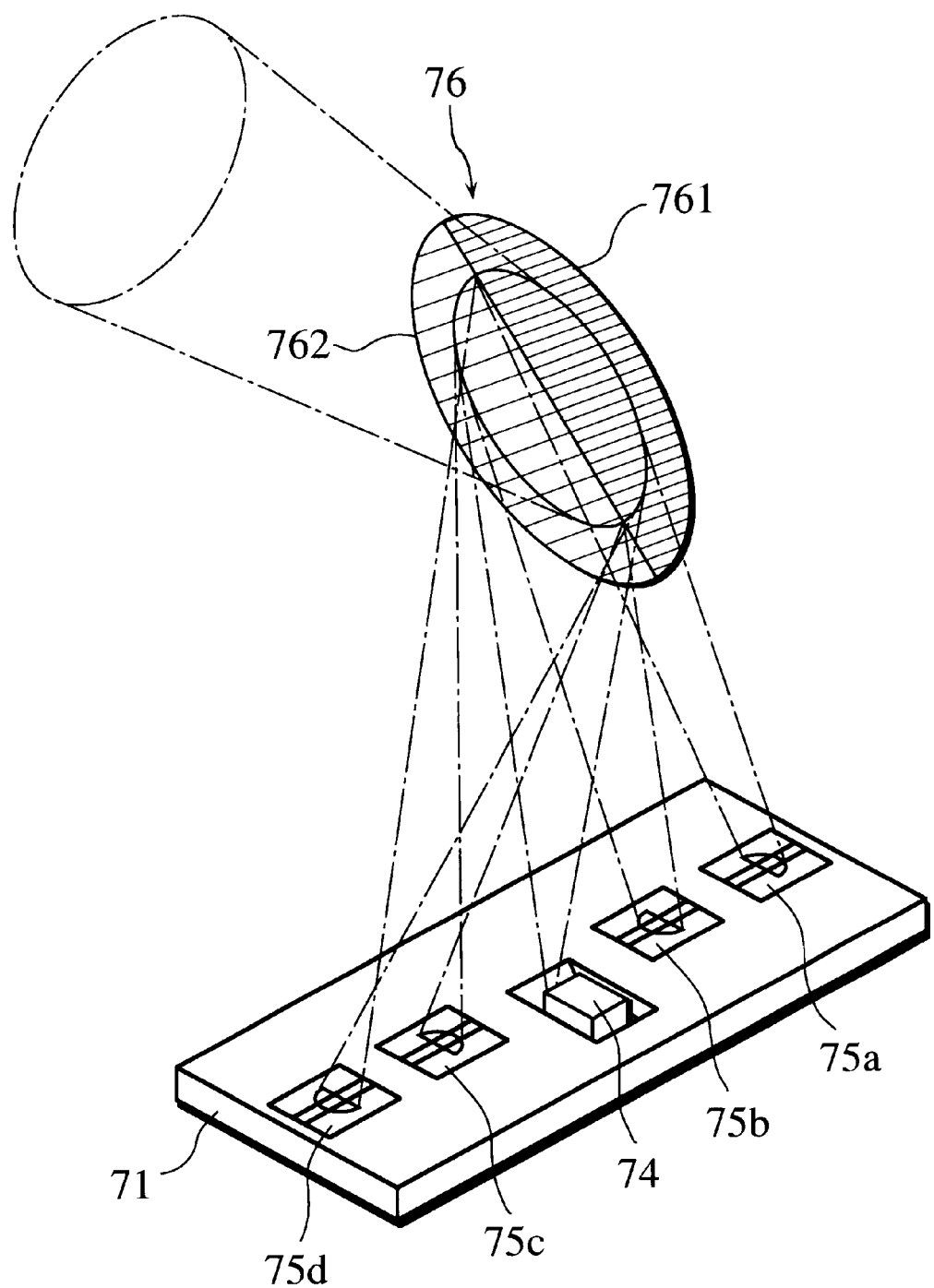
FIG. 10 shows a state in which a plurality of beams, which have been reflected by an optical recording medium, are diffracted and focused by the above reflecting hologram region onto each photodetector.

FIG. 10 is a perspective view showing a state in which the above plurality of diffracted beams are focused on the light emitting/receiving substrate 71. As shown in the figure, the semiconductor laser 74 is positioned in an approximate center of the light emitting/receiving substrate 71. Three-part split photodetectors 75a–75d are also formed on the light emitting/receiving substrate 71 in a manner that positive and negative first-order diffracted beams diffracted by the hologram subregions 761 and 762 can be focused onto these photodetectors 75a–75d. These photodetectors 75a–75d detect both a focusing error and a tracking error.

For detecting the focusing error, Spot Size Detection method is used. With this method, changes in spot diameters of positive and negative first-order diffracted beams are detected. For detecting the tracking error, Push-Pull method is used. With this method, a tracking error is detected based on a detection result of differentials in a certain direction of laser beams reflected by the hologram subregions 761–762. The above certain direction is a direction perpendicular to tracks of the optical recording medium 80.

In accordance with the focusing error detected by the photodetectors 75a–75d, the control circuit controls a current to be supplied to the focusing coil 251 in the enclosure 220. An electromagnetic force is produced in the focusing coil 251 present in a magnetic circuit in accordance with the supplied current. As a result, the enclosure 220 is moved in the direction of the optical axis of the objective lens 210. In this way, the optical pickup 200 performs focusing servo, that is, correctly focusing the laser beam onto the recording surface of the optical recoding medium 80.

After this, in accordance with a result of the tracking error detection by the photodetectors 75a–75d, the control circuit controls a current to be supplied to the tracking coil 252. In accordance with the current supplied to the tracking coil 252, a magnetic driving force is produced in the tracking coil 252 present in the magnetic circuit. As a result, the enclosure 220 is moved in a direction across tracks of the optical recording medium 80. In this way, the optical pickup 200 performs tracking servo, that is, repositions the laser beam on a track from which data should be read. After this, the photodetectors 75a–75d detect an information signal.

The semiconductor laser 74 may be a semiconductor laser with a uniform wavelength band, or be replaced with two or more semiconductor lasers that each have a different wavelength, or a monolithic multi-wavelength semiconductor laser having emission points that correspond to at least two different wavelength bands. A reproduction wavelength suitable to each optical recording medium type is selected. Accordingly, when the semiconductor laser 74 has multi wavelengths as described above, the optical pickup 200 can make reproduction and recording for many types of optical recording media.

Production Method of Optical Pickup 200

Figure 11:
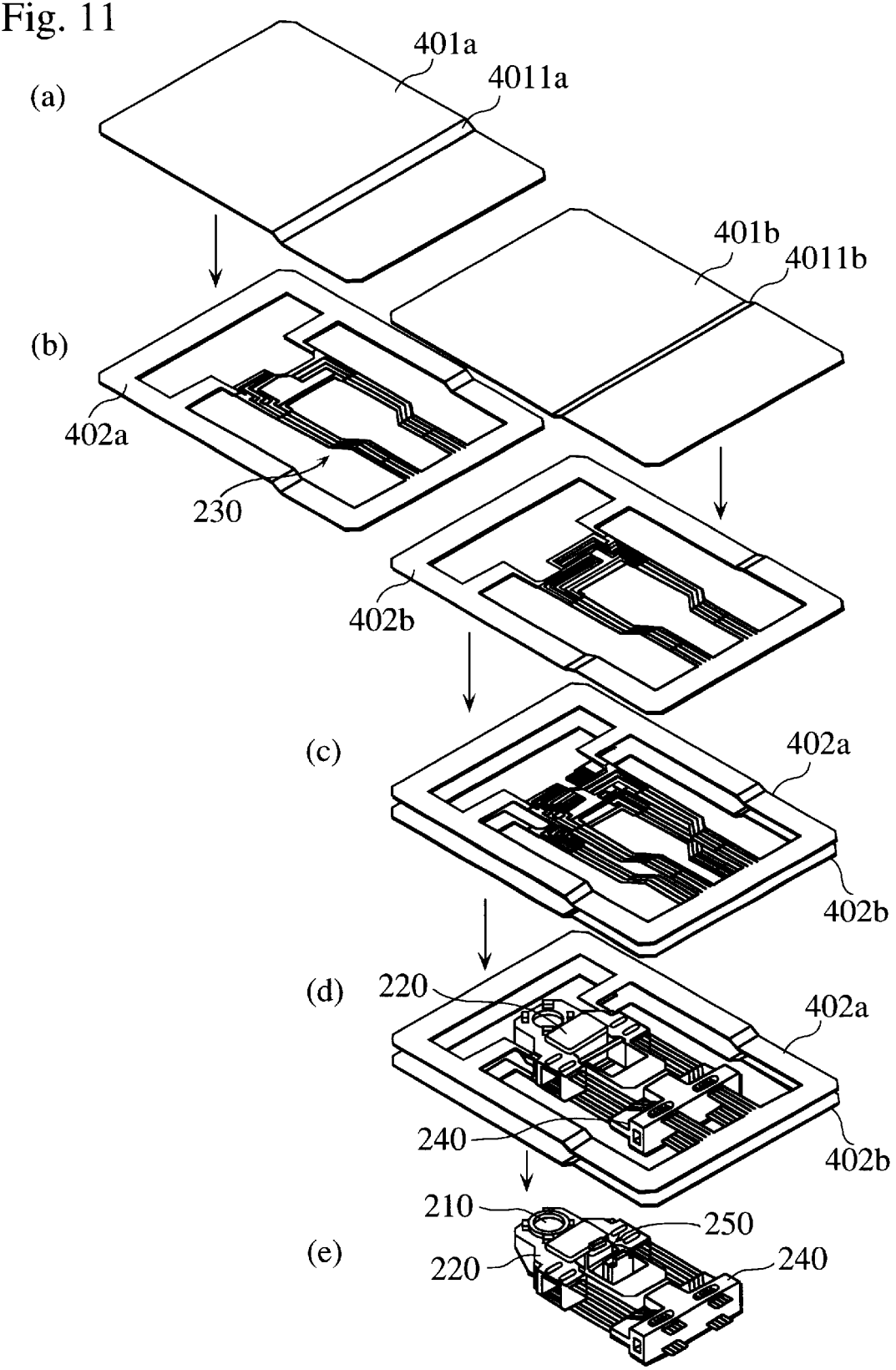
FIG. 11 is a diagram showing production process for the above optical pickup.

The following describes a production method of the optical pickup 200 of the second embodiment with reference to FIG. 11.

This production method is similar to the production method described in the first embodiment, and uses the insert molding, with which the enclosure 220, the fixed member 240, and the elastic supporting members 230 are integrally molded.

Two conductive plates 401a and 401b made of phosphor bronze, titanium copper, beryllium copper, or the like are used to produce the upper and lower elastic supporting members 230. By performing press working using a bending mold on these plates 401a and 401b, the plates 401a and 401b are bent upward and downward, respectively, so that sloped parts 4011a and 4011b are formed (Step "a").

The plates 401a and 401b are die-cut using a press mold to remove their predetermined inner parts. As a result, an upper frame member 402a and a lower frame member 402b that each have a shape of two groups of supporting members linked to an outer part of the frame member 402a or 402b are produced (Step "b"). The press mold above has a form that makes two groups of supporting members arranged side by side bend in the sloped parts 4011a or 4011b toward the center of the two groups. As a result, bent parts like the bent part 231 are formed.

Following this, top molds, side molds, and a bottom mold are attached to the upper and lower frame members 402a and 402b that face each other at a predetermined interval so that the upper and lower frame members 402a and 402b are fastened inside the molds (Step "c" in FIG. 11 in which the molds are not shown). After this, the insert molding is performed by injecting a resin into these molds. As a result, the enclosure 220, the fixed member 240, and the elastic supporting members 230 are integrally molded, with end parts of the supporting members 230 being embedded in the enclosure 220 and the fixed member 240 (Step "d").

Following this, the light emitting/receiving substrate 71 and the objective-lens/hologram component 211 are affixed to the enclosure 220, and then the driving coil unit 250 and other components are installed in the enclosure 220. The supporting members 230 are electrically connected to electrical terminals inside the enclosure 220 by using solder, bonding wires, or the like.

After this, unnecessary portions, such as frame-like portions of the frame members 402a and 402b remaining around the enclosure 220 and the fixed member 240 are removed so as to electrically separate the supporting members 230 from one another (Step "e").

This enables the supporting members 230 to be used as lines for supplying a driving current to the semiconductor laser 74 and the driving coil unit 250, and for supplying a driving voltage and carrying a detection signal to/from the photodetectors 75a–75d.

Finally, the concaves 241–244 of the fixed member 240 are impregnated with the damping material (not shown in the figure) for suppressing resonance. The fixed member 240 is then affixed to the optical base 245 (not shown in the figure) on which magnets 254 are also affixed via the yoke 253.

Note that the process in Step "e" for removing unnecessary parts may be performed either before optical components are installed or after the fixed member 240 is affixed on the optical base 245.

With the above production method for the optical pickup 200, the enclosure 220 and the fixed member 240 are integrally molded while the frame members 402a and 402b are affixed by molds. Accordingly, it is unnecessary to connect the plurality of supporting members 230 one by one to the enclosure 200 and the fixed member 240.

In addition, unnecessary parts are removed from the frame members 402a and 402b after the insert molding, which allows all the plurality of supporting members 230 to be connected in a uniform state to the enclosure 220 and the fixed member 240, so that variations in connecting states of the plurality of supporting members 230 are suppressed. This allows the movable enclosure 220 to be correctly supported, and increases productivity at the same time.

As has been described, the present invention can provide an optical-component-integrated optical pickup carrying all the optical components in the movable enclosure, and this optical pickup of the integration-type is capable of effectively suppressing resonance and has stable optical properties. The present invention can also provide the production method for such optical pickup which achieves high productivity.

Modification Examples

The optical pickups and the production methods of the present invention have been described using several embodiments. The present invention, however, is not limited to the above embodiments, and possible modification examples are described below.

(1) The optical pickup described in the above embodiments has a construction of the so-called "moving-coil type" actuator, for which the driving coil unit is provided in the movable member, and the magnets are affixed to the optical base. However, the present optical pickup may alternatively have a construction of the so-called "moving-magnet type" actuator for which the driving unit is affixed to the optical base and magnets are provided in the movable member.

(2) To achieve the uniform resonance-suppressing effect and uniform supporting forces, all the bent parts of the supporting members should be preferably provided in the same position relative to the longitudinal direction of the supporting members. At the same time, it is preferable to form these bent parts symmetrically in the vertical and horizontal directions. However, a small amount of displacement in the symmetrical formation of the supporting members is tolerable if such displacement has no negative effect on reading precision.

Shapes of each bent part is not limited to as described in the above embodiments, and the bent part may have a shape curved in the direction "Z".

When there are many elastic supporting members as in the second embodiment, not all of them need to include bent parts. Even when some of the supporting members have a bent part, resonance can be sufficiently suppressed.

(3) In the above embodiments, the damping material is present between a concave of the fixed member and a bent part so that the bent part is supported via the damping material by the concave. Although this increases effect of suppressing resonance, the position impregnated with the damping material is not limited to these embodiments. When the damping material is only affixed to a bent part to cover it, resonance can be suppressed to a certain extent.

(4) In the supporting members of the above embodiments, a bending in the "Z" direction and a bending in the "Y" direction are formed in substantially the same position relative to the direction "X". This is not necessary, however, and the two bendings may be made in different parts of the supporting member. In this case, however, a larger amount of the damping material is required since a part that should be impregnated with the damping material becomes larger. To save the damping material, making the two bendings in approximately the same position is more desirable.

(5) The above embodiments describe the production methods (see FIGS. 5 and 11) with which the insert molding is performed using a single group of molds to produce a single optical pickup. However, it is possible to produce a plurality of optical pickups simultaneously by using a single group of molds.

Figure 12:
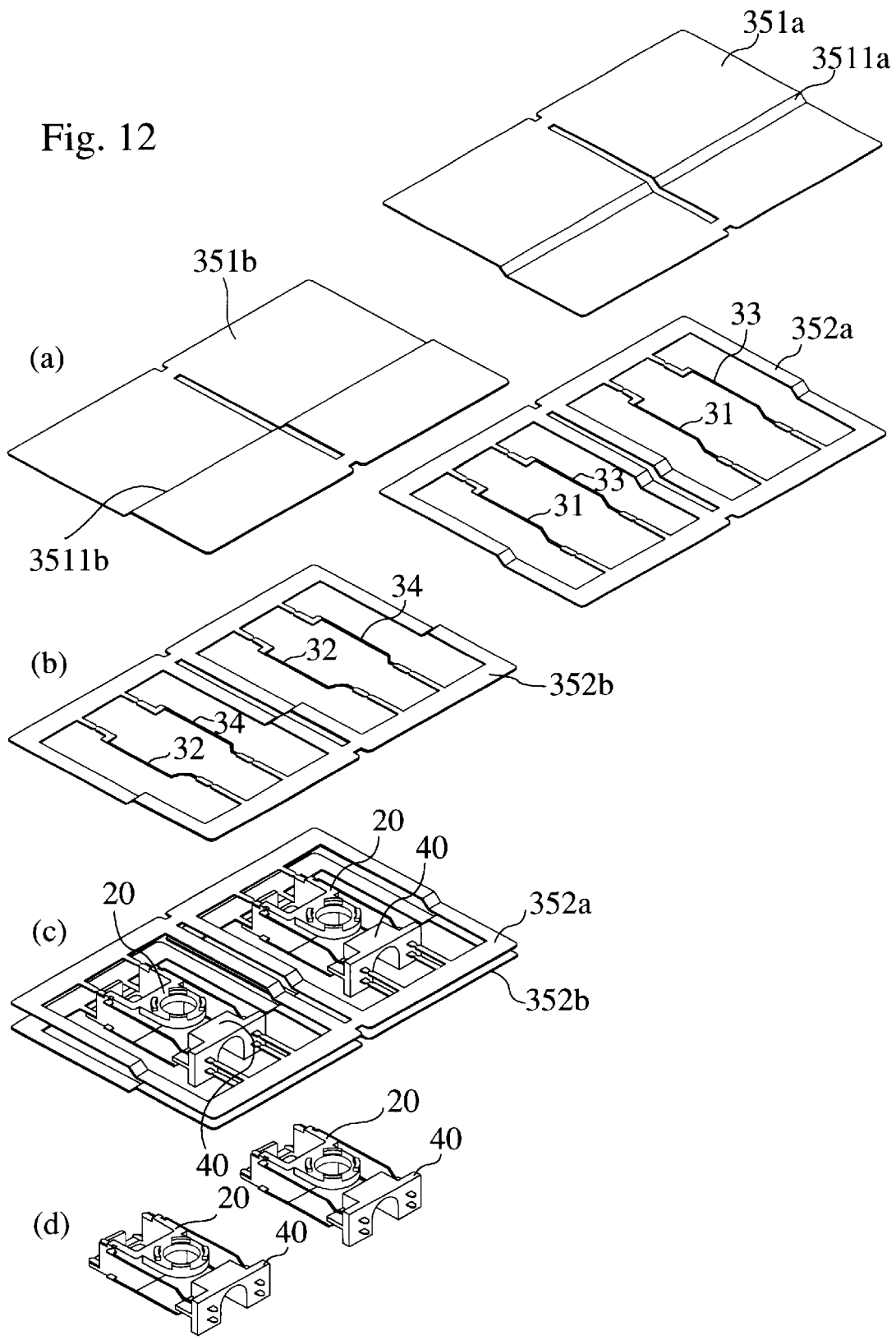
FIG. 12 shows process steps for molding two bodies of the lens driving devices shown in FIG. 2 side by side by the insert molding.

The following describes this modification production method with reference to FIG. 12. With this method, two lens driving devices 100 of the first embodiment are integrally molded side by side through the insert molding.

Two conductive plates 351a and 351b made of phosphor bronze, titanium copper, or beryllium copper, for instance, are used to produce the upper and lower elastic supporting members 31–34 for the two lens driving devices 100. By performing press working using a bending mold on these plates 351a and 351b, the plates 351a and 351b are bent downward and upward, respectively, so that sloped parts 3511a and 3511b are formed (Step "a").

The plates 351a and 351b are die-cut using a press mold to remove unnecessary parts. This produces an upper frame member 352a and a lower frame member 352b which each have a shape of supporting members for the two driving devices 100 which are linked to an outer part of the plates 351a and 351b (Step "b").

Following this, the lower frame member 352b is positioned on a bottom mold (not shown in the figure), and then side molds are applied from right and left with respect to a direction in which the supporting members extend. At the same time, a core mold is placed in the center of the structure corresponding to the optical pickups. Parts of the bottom mold, the side molds, and the core mold are in contact with one another in a manner that they sandwich parts of the lower frame member 352b in between. After this, the upper frame member 352a is positioned on the top of the side molds and the core mold, and a top mold (not shown in the figure) covers the upper frame member 352a from the top. As a result, the top mold, the side molds, and the core mold sandwich parts of the upper frame member 352a in between.

After this, the insert molding is performed using a resin on the two frame members 352a and 352b that are completely fixed inside the above molds. As a result, two lens holding units 20 and the fixed members 40 are integrally molded, with end parts of the supporting members 31–34 being embedded in each lens holding member 20 and each fixed member 40 (Step "c").

All the molds are then removed, and unnecessary portions, such as frame-like portions remaining on the periphery of the lens holding units 20 and the fixed members 40, are removed to electrically separate supporting members 31–34 from one another. As a result, two bodies of the lens driving devices 100 are formed (Step "d").

When the higher number of the lens driving devices 100 are simultaneously produced by the insert molding in this way, the productivity becomes higher and the cost becomes lower.

In FIG. 12, the two bodies of the lens driving devices are molded side by side through the insert molding, and therefore a core mold is necessary. When a plurality of bodies are molded in a state they are positioned end to end (along the longitudinal direction of the supporting members), no core mold is necessary, and a group of four pieces of molds are only required. This is also advantageous to the mass production of the optical pickups.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A lens driving device, comprising:

an objective lens;

a first member that holds the objective lens;

a second member;

a plurality of supporting members that are elastic and that each include a first connected part and a second connected part that are connected respectively to the first member and the second member, so that the second member supports the first member in a manner that allows the first member to move in predetermined directions with respect to the second member; and a driving unit for driving the first member in the predetermined directions, wherein the plurality of supporting members each include a first bent part and a second bent part that are present between the first connected part and the second connected part, the first bent part bending in a first direction, the second bent part bending in a second direction that is substantially perpendicular to the first direction.

2. The lens driving device of claim 1, wherein the first direction is parallel to an optical axis of the objective lens, and the second direction is perpendicular to a longitudinal direction of the supporting member and to the first direction.

3. The lens driving device of claim 1, wherein the first bent part and the second bent part are covered with a damping material.

4. The lens driving device of claim 3, wherein the damping material is substantially made of a gel material.

5. The lens driving device of claim 1, wherein the first bent part and the second bent part are present in substantially the same position relative to a longitudinal direction of the supporting member.

6. The lens driving device of claim 1, wherein the first bent part and the second bent part interact with each other to absorb vibrations occurring in all directions that are perpendicular to a longitudinal direction of each supporting member.

7. The lens driving device of claim 1, wherein each of the plurality of supporting members is a narrow plate, and all principal planes of each supporting member are parallel to a certain direction that is perpendicular to a longitudinal direction of the plurality of supporting members.

8. The lens driving device of claim 7, wherein the certain direction is the second direction.

9. The lens driving device of claim 1, wherein the first member and the second member are formed by injection molding, in a manner that the first connected part and the second connected part are embedded in the first member and the second member, respectively.

10. An optical pickup, comprising:

a semiconductor laser for emitting a laser beam;

an objective lens for converging the emitted laser beam on an optical recording medium;

a first member that holds the objective lens;

a second member;

a plurality of supporting members that are elastic and that each include a first connected part and a second connected part that are connected respectively to the first member and the second member so that the second member supports the first member in a manner that allows the first member to move in predetermined directions with respect to the second member; and a driving unit for driving the first member in the predetermined directions, wherein the plurality of supporting members each include a first bent part and a second bent part that are present between the first connected part and the second connected part, the first bent part bending in a first direction, the second bent part bending in a second direction that is substantially perpendicular to the first direction.

11. The optical pickup of claim 10, wherein the first direction is parallel to an optical axis of the objective lens, and the second direction is perpendicular to a longitudinal direction of the supporting member and to the first direction.

12. The optical pickup of claim 10, wherein the first bent part and the second bent part are covered with a damping material.

13. The optical pickup of claim 12, wherein the damping material is substantially made of a gel material.

14. The optical pickup of claim 10, wherein the first bent part and the second bent part are present in substantially the same position relative to a longitudinal direction of the supporting member.

15. The optical pickup of claim 10, wherein the first bent part and the second bent part interact with each other to absorb vibrations occurring in all directions that are perpendicular to a longitudinal direction of each supporting member.

16. The optical pickup of claim 10, wherein each of the plurality of supporting members is a narrow plate, and all principal planes of each supporting member are parallel to a certain direction that is perpendicular to a longitudinal direction of the plurality of supporting members.

17. The optical pickup of claim 16, wherein the certain direction is the second direction.

18. The optical pickup of claim 10, further comprising a photodetector, wherein the first member also holds the semiconductor laser and the photodetector and keeps a predetermined positional relationship among the semiconductor laser, the photodetector, and the objective lens.

19. A production method for producing a lens driving device that comprises: a body structure including (a) a first member for holding an objective lens and (b) a second member for supporting the first member via a plurality of supporting members; and a driving unit for driving the first member in predetermined directions with respect to the second member to move the objective lens, wherein the production method includes:

a body structure producing step for producing the body structure;

a lens affixing step for affixing the objective lens to the first member in the body structure; and a driving unit affixing step for affixing the driving unit to the body structure, wherein the body structure producing step includes:

a supporting member producing substep for processing a plate to form the plurality of supporting members that each include a first bent part and a second bent part between both extremities of each supporting member, the first bent part bending in a first direction that is perpendicular to a principal plane of the plate, the second bent part bending in a second direction that is parallel to the principal plane and perpendicular to a longitudinal direction of the plurality of supporting members; and an injection molding substep for molding the first member and the second member by injection molding in a manner that predetermined parts of each supporting member are embedded in the first and second members, each predetermined part being a connection part to one of the first member and the second member.

20. The production method of claim 19, wherein the supporting member producing substep includes:

a first substep for performing press working on the plate so that a sloped part which corresponds to each first bent part is formed on the plate; and a second substep for performing, on the plate on which the sloped part has been formed, one of etching process and press working using press molds, so that each second bent part is formed on the plate.

21. The production method of claim 20, wherein in the supporting member producing substep, the plurality of supporting members are produced in a manner that the plurality of supporting members extend substantially parallel to one another at predetermined intervals, with both extremities of each supporting member being linked to an outer part of the plate.

22. The production method of claim 21, further including a removing step after the injection molding substep, wherein in the removing step, the outer part of the plate is cut to be removed.

23. A production method for producing a lens driving device that comprises: a body structure including (a) a first member for holding an objective lens and (b) a second member for supporting the first member via a plurality of supporting members; and a driving unit for driving the first member in predetermined directions with respect to the second member to move the objective lens, wherein the production method includes:

a body structure producing step for producing a plurality of body structures;

a lens affixing step for affixing an objective lens to a first member in each of the plurality of body structures; and a driving unit affixing step for affixing a driving unit to each of the plurality of body structures, wherein the body structure producing step includes:

a supporting member producing substep for processing a plate to form a plurality of sets of supporting members, each set of supporting members corresponding to one of the plurality of body structures, each supporting member including a first bent part and a second bent part between both extremities of the supporting member, the first bent part bending in a first direction that is perpendicular to a principal plane of the plate, the second bent part bending in a second direction that is parallel to the principal plane and perpendicular to a longitudinal direction of the plurality of supporting members; and an injection molding substep for simultaneously molding a plurality of first and second members that correspond to the plurality of body structures by injection molding using a single set of molds in a manner that predetermined parts of each supporting member are embedded in a first member and a second member, each predetermined part being a connection part to one of a first member and a second member.

* * * * *